M. BERTHIER.
DIFFERENTIAL MECHANISM OF AUTOMOBILE VEHICLES.
APPLICATION FILED MAY 28, 1912.
1,075,686.
Patented Oct. 14, 1913.
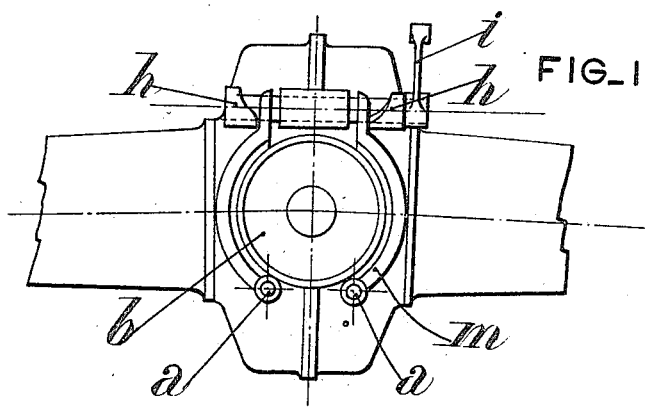
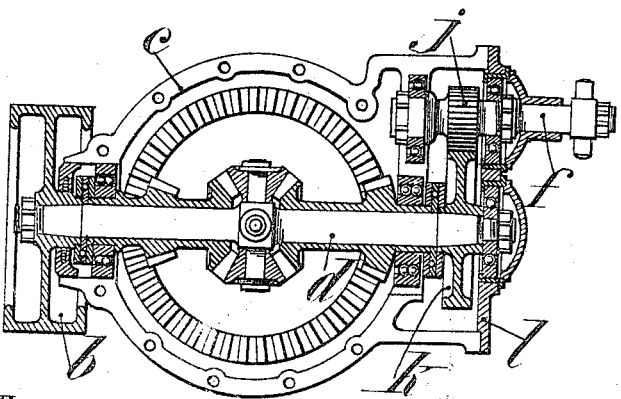
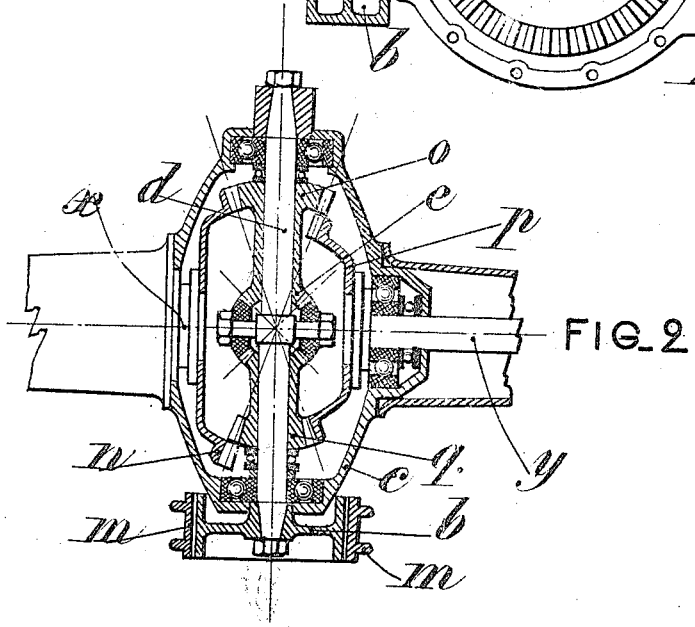
WITNESSES:
John C. Sanders
Albert F. Neuman
INVENTOR:
Michel Berthier
BY Wallace White
ATT'Y

UNITED STATES PATENT OFFICE.

MICHEL BERTHIER, OF LYON, FRANCE, ASSIGNOR TO LA SOCIÉTÉ NOUVELLE DE LA BUIRE AUTOMOBILES, OF LYON, FRANCE.

DIFFERENTIAL MECHANISM OF AUTOMOBILE VEHICLES.

1,075,686.  Specification of Letters Patent.  Patented Oct. 14, 1913.

Application filed May 28, 1912. Serial No. 700,172.

*To all whom it may concern:*

Be it known that I, MICHEL BERTHIER, a citizen of the French Republic, residing at Lyon, in France, have invented certain new and useful Improvements Relating to Differential Mechanism of Automobile Vehicles, of which the following is a specification.

This invention relates to improvements in differential mechanism of automobile vehicles and is applicable to motor cars or other vehicles driven by mechanical motors in which the rear axle is provided with a differential mechanism including double conical or beveled gears allowing independent action of the running wheels of the vehicle.

The invention essentially consists in the application of a brake of any kind on the rear end of the longitudinal shaft of the differential mechanism.

In the annexed drawings which show embodiments of the invention Figure 1 is a rear elevation of the gear box. Fig. 2 is a horizontal section through the axis of the differential mechanism and Fig. 3 is a vertical section through the same axis showing the application of speed reducing gearing.

As shown the differential mechanism $e$ is driven by the longitudinal shaft $d$ the two parts of said differential mechanism each driving one of the two axle members $x$, $y$ by means of beveled gear wheels $o$, $p$, $q$, $n$. The mechanism is usually inclosed in a fixed casing $c$. The brake pulley $b$ is keyed on the rear end of the aforesaid shaft $d$ outside the casing $e$, the brake illustrated being of that kind which has outer bands or jaws $m$ $m$ pivoted at $a$ $a$ to the casing and acting on the pulley $b$ by means of two cams $h$ $h$ with oppositely directed tracks and mounted on the same shaft which is operated by the lever $i$. Any other kind of brake acting on the rear end of the shaft $d$ may however be used without departing from the spirit of the invention.

This arrangement has the following advantages, firstly, of allowing energetic braking action at a point under the vehicle even in case of breakage of or damage to the transmission shaft; secondly, of preventing wear of the pivots or joints of the universal joint of the transmission gearing; thirdly, of assuring perfect cooling of all the brake apparatus which considerably lessens the tendency to heating thereof during long descents, and fourthly, by its position at the back of the vehicle inspection, dismounting and adjustment of all its parts are facilitated.

It should be remarked that either for the good action of the brake or in order not to exaggerate the sizes of the conical or beveled wheels which drive the running wheels of the vehicle the differential shaft $d$ carrying the brake must not rotate at too great a speed. This speed is usually reduced by the speed change gearing but for vehicles which normally run at a low speed and necessitate from this fact great reduction, it is advantageous to obtain this partly inside the casing which incloses the live axle. Fig. 3 which is a vertical section of a live axle shows the arrangement adopted for this purpose. Two gears $j$ and $k$ are arranged at the front of the casing of which the larger one $k$ is keyed on the shaft $d$ which carries the brake pulley $b$, the smaller gear $j$ being keyed on a shaft $f$ driven by the motor. A removable cover $l$ which closes the front of the casing allows, if required, of removing the gears $j$ and $k$ and replacing them by others of a different ratio.

What I claim as my invention and desire to secure by Letters Patent of the United States is:—

1. In a differential transmission gearing, the combination with a shaft, driving gears on said shaft, axle members on opposite sides of said shaft, driven gears on said axle members adapted to mesh with the aforesaid gears, a casing inclosing said gears, a brake drum on one end of said shaft outside the casing and means for applying frictional pressure to the periphery of said drum.

2. In a differential transmission gearing, a main shaft and gears thereon, a casing inclosing said gears, a brake device on said shaft outside said casing, and speed reducing gearing coacting with said shaft within the casing.

3. In a differential transmission gearing, the combination with a shaft, driving gears on said shaft, axle members on opposite sides of said shafts, driven gears on said axle members adapted to mesh with the aforesaid gears, a casing inclosing said gears, a brake drum on one end of said shaft outside the casing, means for applying frictional pressure to the periphery of said drum, and speed reducing gearing coacting with said shaft within the casing.

In witness whereof I have signed this specification in the presence of two witnesses.

MICHEL BERTHIER.

Witnesses:
 GASTON YEANNIAUX,
 MARIUS MERMAZ.